US012041028B2

(12) United States Patent
Brockhaus et al.

(10) Patent No.: US 12,041,028 B2
(45) Date of Patent: Jul. 16, 2024

(54) SYSTEM AND METHOD FOR OPTIMIZING COMPUTING RESOURCES AND DATA FLOW IN NETWORKS

(71) Applicant: Vertiv IT Systems, Inc., Huntsville, AL (US)

(72) Inventors: David Brockhaus, Madison, AL (US); Hongbo Liu, Huntsville, AL (US); Agustin Roca, Huntsville, AL (US); Joerg Weedermann, Santa Clara, CA (US); Donald Sturgeon, Huntsville, AL (US)

(73) Assignee: Vertiv IT Systems, Inc., Huntsville, AL (US)

( * ) Notice: Subject to any disclaimer, the term of this patent is extended or adjusted under 35 U.S.C. 154(b) by 0 days.

(21) Appl. No.: 17/879,368

(22) Filed: Aug. 2, 2022

(65) Prior Publication Data

US 2023/0042105 A1 Feb. 9, 2023

Related U.S. Application Data

(60) Provisional application No. 63/228,941, filed on Aug. 3, 2021.

(51) Int. Cl.
*G06F 3/023* (2006.01)
*G06F 3/038* (2013.01)
(Continued)

(52) U.S. Cl.
CPC ............ *H04L 61/256* (2013.01); *G06F 3/023* (2013.01); *G06F 3/038* (2013.01); *H04L 12/4641* (2013.01)

(58) Field of Classification Search
CPC ..... H04L 61/09; H04L 61/25; H04L 61/2503; H04L 61/256; H04L 12/28; H04L 12/46; H04L 12/4641; G06F 3/023
See application file for complete search history.

(56) References Cited

U.S. PATENT DOCUMENTS 8,473,651 B1* 6/2013 Sundaravel ........... G06F 3/0227 710/1
10,885,869 B2* 1/2021 Chew .................... G06F 21/602
(Continued)

OTHER PUBLICATIONS

NetApp—"What are Containers?" (Year: 2020).*

*Primary Examiner* — Boris D Grijalva Lobos
(74) *Attorney, Agent, or Firm* — Suiter Swantz IP

(57) ABSTRACT

A system and method for optimizing processing of keyboard/video/mouse (KVM) data in an internet protocol (IP) network environment receives via public interface access requests from users directed to KVM targets. The system includes a public and private virtual local area network (VLAN) linked by a bonded interface and general-purpose and optimized application containers. The general-purpose container initiates a KVM session and creates a network address translation (NAT) route (associated with an IP address visible to the user) and a dedicated interface via which the user may send KVM data directly and through the optimized application container, which prioritizes KVM data so it can pass without preemption through the private VLAN and to its intended KVM target in real-time or near real-time. The NAT route and external IP address may be reused for multiple access sessions to different KVM targets from the same user.

16 Claims, 8 Drawing Sheets

(51) Int. Cl.
*H04L 12/46* (2006.01)
*H04L 29/12* (2006.01)
*H04L 61/256* (2022.01)

(56) References Cited

U.S. PATENT DOCUMENTS

| | | | |
|---|---|---|---|
| 2007/0115992 A1* | 5/2007 | Weinstock | G06F 3/023 370/392 |
| 2010/0049890 A1* | 2/2010 | Best | G06Q 50/16 710/73 |
| 2016/0219095 A1* | 7/2016 | Richardson | G06F 3/04842 |
| 2022/0075678 A1* | 3/2022 | Yamamoto | G06F 9/45558 |
| 2023/0042105 A1* | 2/2023 | Brockhaus | H04L 61/256 |

* cited by examiner

410 — Receiving, at the optimized application container and via the dedicated interface, KVM data from the user, the KVM data associated with the KVM session 412 — Assigning, via the optimized application container, a maximum priority level to the received KVM data 414 — Routing, via the optimized application container, the KVM data to the KVM target device via the NAT route

FIG. 4B

SYSTEM AND METHOD FOR OPTIMIZING COMPUTING RESOURCES AND DATA FLOW IN NETWORKS

CROSS-REFERENCE TO RELATED APPLICATIONS

The present application claims the benefit under 35 U.S.C. § 119(e) of U.S. Provisional Patent Application Ser. No. 63/228,941, filed Aug. 3, 2021, entitled SYSTEM AND METHOD FOR OPTIMIZING COMPUTING RESOURCES AND DATA FLOW IN NETWORKS, and naming David Brockhaus, Hongbo Liu, Agustin Roca, Joerg Weedermann, and Donald Sturgeon as inventors. Said U.S. Provisional Patent Application 63/228,941 is incorporated herein by reference in its entirety.

TECHNICAL FIELD

The present disclosure relates generally to data flow in networking, and more particularly to optimizing computing resources and data flow of keyboard, video, and mouse (KVM) data in networks.

BACKGROUND

When using a network for computing data, servers receive keyboard and mouse signals provided from a client, processing those signals using the application(s) on the server, creating a video signal based on the signals and application, and transmitting the video signal back to the client for display at the client workstation. In that way, a client user can communicate with a server to employ the server's services using inputs from the client and receive back the appropriate video information resulting from the client request and server response.

With keyboard, mouse, and video (KVM) transmissions, clients want to be able to access end targets in a manner that is efficient, while those who manage the network want to ensure that the network is secure, with proper access control protocols being followed. Conventional networks employ complex hardware devices to route KVM transmissions, but such systems are limited by their exorbitant cost to employ and limited adaptability.

Accordingly, it may be advantageous for a system and method to remedy the shortcomings of the conventional approaches identified above.

SUMMARY

Embodiments of the inventive concepts disclosed herein are directed to a system and method for optimizing processing of keyboard/video/mouse (KVM) data in an internet protocol (IP) network environment. For example, the system receives via public interface access requests from users directed to KVM targets. The system includes a public and private virtual local area network (VLAN) linked by a bonded interface and general-purpose and optimized application containers. The general-purpose container initiates a KVM session and creates a network address translation (NAT) route (associated with an IP address visible to the user) and a dedicated interface via which the user may send KVM data directly and through the private VLAN and the optimized application container, which prioritizes KVM data so it can pass without preemption through the private VLAN and to its intended KVM target in real-time or near real-time. The NAT route and external IP address may be reused for multiple access sessions to different KVM targets from the same user.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIGS. 4A through 4D are process flow diagrams illustrating a method for optimized processing of KVM data according to example embodiments of this disclosure.

DETAILED DESCRIPTION

Figure 1:
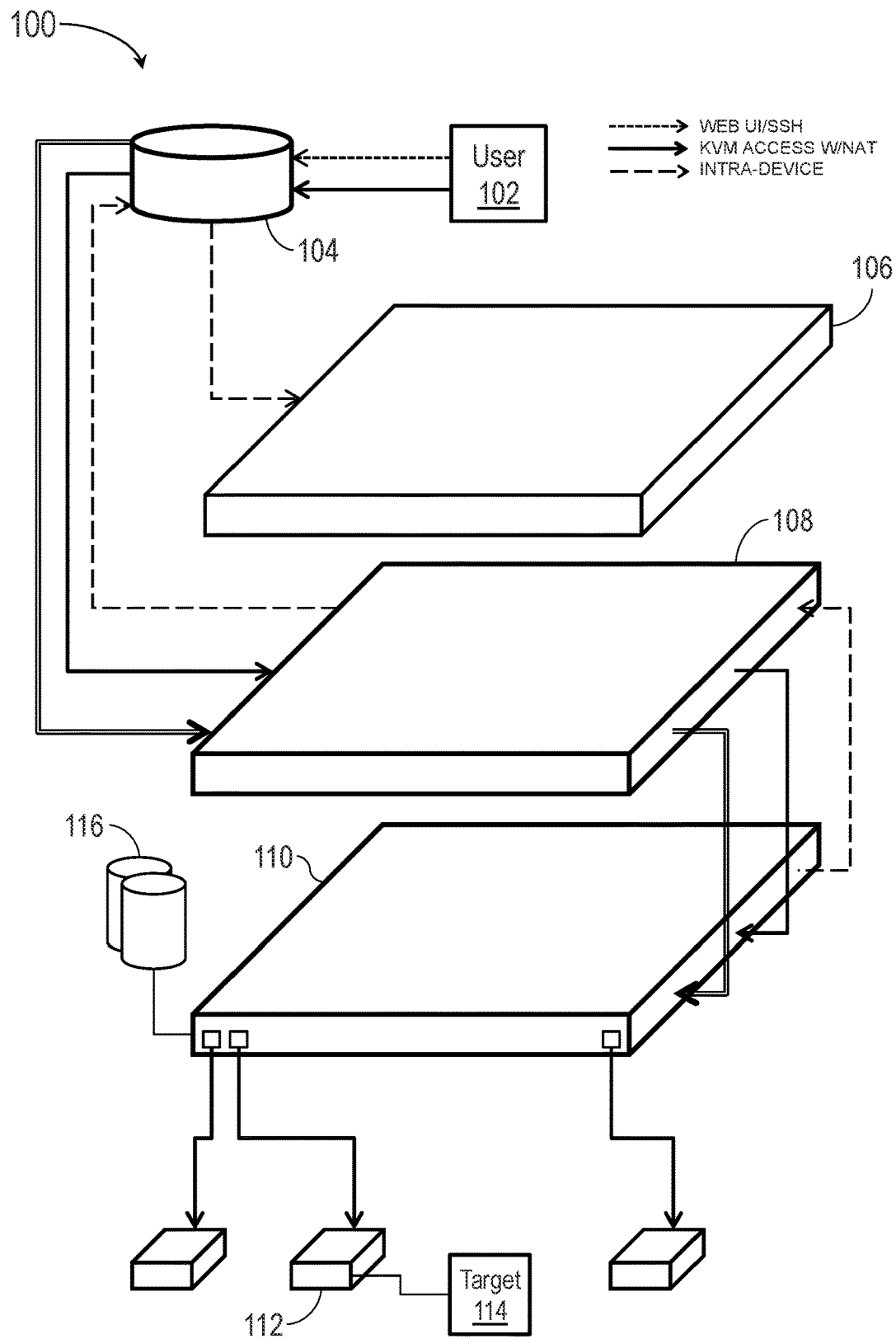
FIG. 1 is a block diagram illustrating a keyboard, video, and mouse (KVM) data processing environment according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring now to FIG. 1, a keyboard/video/mouse (KVM) processing environment 100 (e.g., a KVM over internet protocol (IP) environment, network environment) is shown. The KVM over IP environment 100 may include users 102 (e.g., clients, viewers), web-based user interface (UI) 104, management platform 106, switching device 108 (e.g., KVM switch, data center switch), rack manager 110, peripheral routing devices 112, and KVM target devices 114.

In embodiments, the KVM over IP environment 100 may allow remotely located users 102 to access and control KVM target devices 114 (e.g., home-based users and office-based KVM target devices) in real-time or near real-time. For example, the web-based UI 104 may provide users 102 with secure shell (SSH) access and KVM access. In embodiments, KVM data may be sent by a user 102 through the web-based UI 104 through the switching device 108 and rack manager 110 to peripheral routing devices 112, which in turn provide the KVM data to the KVM target devices 114 (and, e.g., retrieve feedback from the KVM target devices for the user). The KVM over IP environment 100 may include all or some of the components shown by FIG. 1 depending upon the size and complexity of the environment. For example, the management platform 106 may not be included in smaller system environments; in some embodiments the management platform 106 or the rack manager 110 (which, e.g., may communicate with each other) may connect the KVM over IP environment to additional servers 116. In embodiments, KVM target devices 114 may be considered private KVM targets in that only users 102 with the proper authentication for accessing and/or controlling a particular KVM target device 114 may do so. For example, the switching device 108 may manage the permissions, authentications, and granting or denial of access to users 102 requesting KVM access to a particular KVM target device 114.

Figure 2:
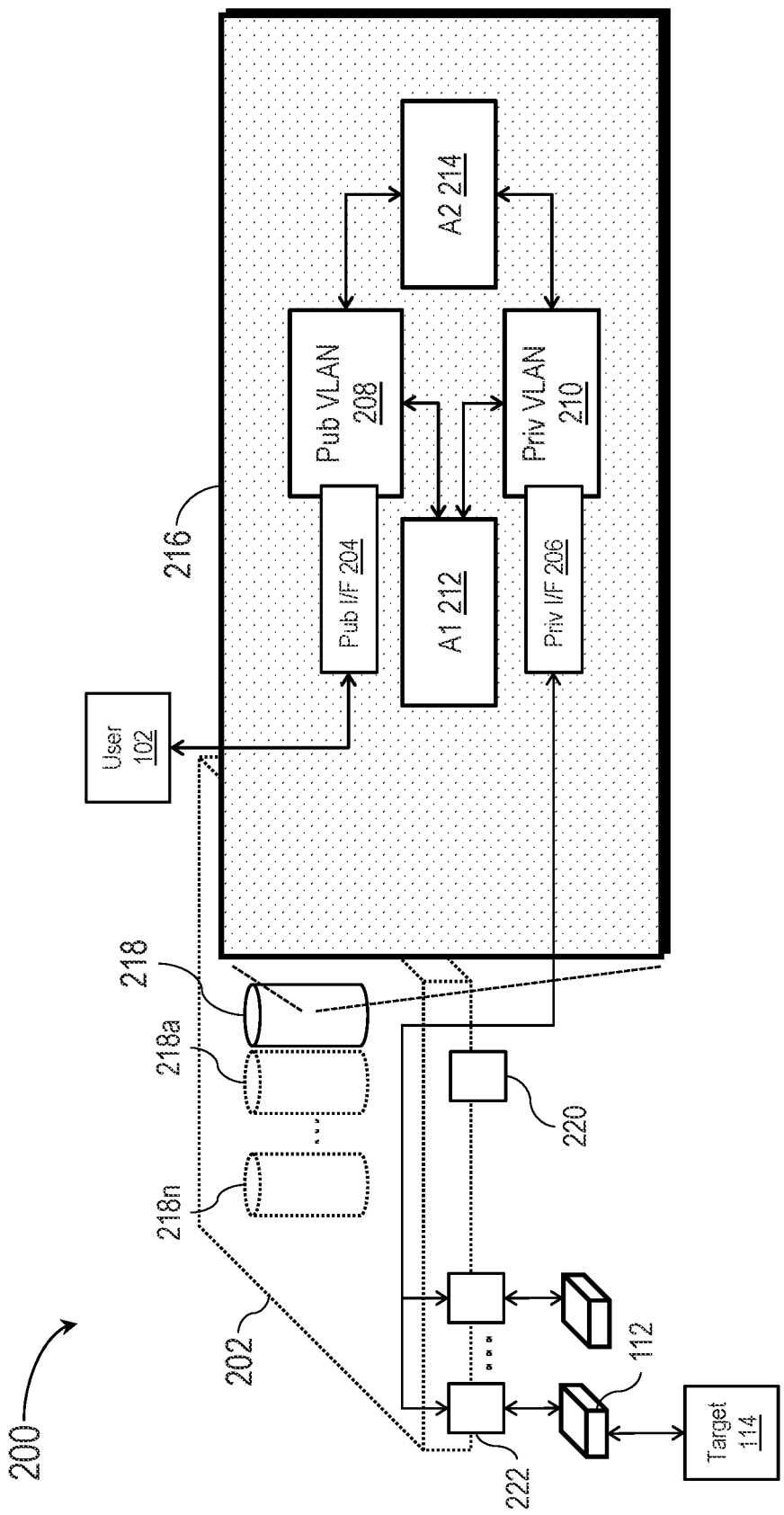
FIG. 2 is a block diagram illustrating a system for processing KVM data within the KVM processing environment of FIG. 1.

Referring now to FIG. 2, a system 200 for optimized KVM processing within the KVM over IP environment 100 (FIG. 1) is shown. The system 200 may include routing platform 202, public interfaces 204, private interfaces 206, external-access public virtual local area network 208 (VLAN), private network VLAN 210, general purpose (A1) application containers 212, and optimized (A2) application containers 214.

In embodiments, the system 200 may be embodied on a software routing layer 216 contained within a single processing core 218 of a multi-core processing environment including additional processing cores 218a . . . 218n. For example, the multi-core processing environment may be embodied within the routing platform 202, which may correspond to the switching device 108 (FIG. 1) or alternatively to the management platform 106 (FIG. 1), the rack manager 110 (FIG. 1), or any like appropriate device or collection of devices. In embodiments, the routing platform 202 may include public ports 220 (e.g., small form factor pluggable transceiver (SFP) ports) and private ports 222, each private port capable of connecting the routing platform to a peripheral routing device 112 (e.g., and thereby to a KVM target device 114). In some embodiments, the system 200 may be distributed among the processing resources of two or more machines within the KVM over IP environment 100 shown by FIG. 1, e.g., one or more of the management platform 106, the switching device 108, the rack manager 110, and/or the peripheral routing devices 112.

In embodiments, the one or more processors of the system 200 may include any processor or processing element known in the art. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the system, as described throughout the present disclosure. Moreover, different subsystems of the system 200 may include a processor or logic elements suitable for carrying out at least a portion of the steps described in the present disclosure. Therefore, the above description should not be interpreted as a limitation on the embodiments of the present disclosure but merely as an illustration.

In embodiments, the public interfaces 204 may be external interfaces (e.g., a web-based UI (104, FIG. 1)) capable of connecting a user 102 (e.g., via a web-based UI 104, FIG. 1) to the public VLAN 208. Similarly, the private interfaces 206 may connect the private VLAN 210 to switched private targets, e.g., peripheral routing devices 112 connected to the private ports 222 of the routing platform 202 (and which may also be connected to KVM target devices 114).

In embodiments, the software routing layer 216 may include general purpose (A1) application containers 212 for managing various processes associated with the KVM over IP environment, e.g., access control information, KVM session control information, and the like. However, A1 application containers 212 may not be optimized for processing KVM data traveling between users 102 and KVM target devices 114. For example, A1 application containers 212 may preempt KVM data in favor of higher priority data streams (e.g., security token refresh, other high priority container handling data) and therefore may not be ideal for real-time or near real-time KVM access operations. In embodiments, A2 application containers 214 may be optimized in that A2 application containers may assign maximum priority to KVM data in transit through the KVM over IP environment 100, allowing the unpreempted processing of KVM data.

In embodiments, the A1 application containers 212 may expedite the processing of KVM access requests and the transmission of KVM data by establishing a dedicated interface via which KVM data may be routed directly, and without preemption by other data streams, between users 102 and KVM target devices 114 via the A2 application containers 214.

Figure 3A:
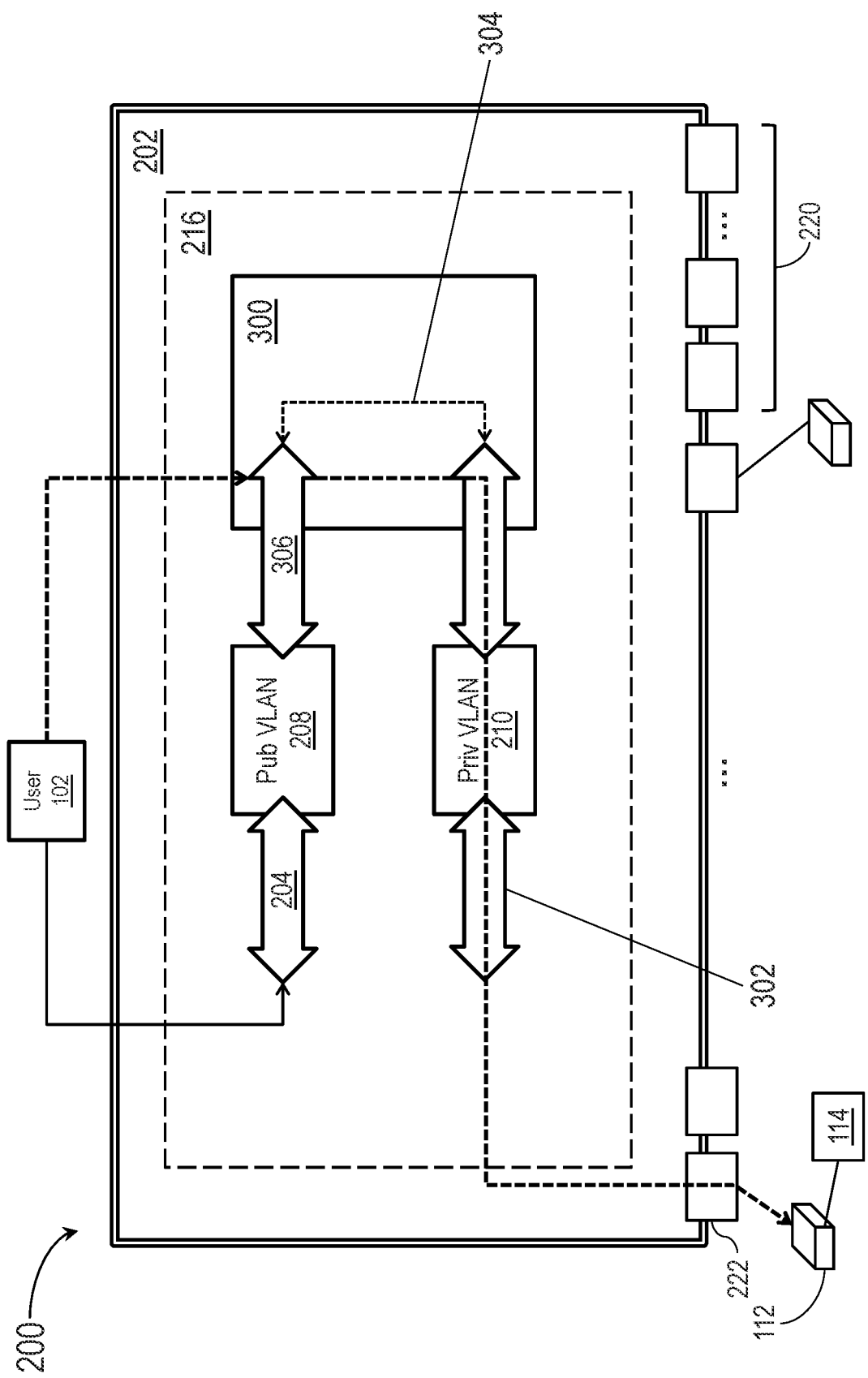
FIGS. 3A and 3B are block diagrams illustrating KVM access request operations of the system of FIG. 2.

Referring now to FIG. 3A, the system 200 is shown.

In embodiments, the public VLAN 208 and private VLAN 210 may be connected within the software routing layer 216 by a bonded interface 300. For example, the bonded interface 300 may be a Vector Packet Processing (VPP) container or interface configured for bonding to the private VLAN 210 with a default static IP address (e.g., 192.168.10.1) as a gateway for KVM target devices 114 (e.g., via peripheral routing devices 112). Similarly, the bonded interface 300 may bond to the public VLAN 208 with either a static IP address or via dynamic host configuration protocol (DHCP). In embodiments, the bonded interface 300 may connect the public VLAN 208 to public SFP ports 220. Further, the private VLAN 210 may connect to the private ports 222 via a virtual routing and forwarding (VRF) interface 302, (or, e.g., a virtual router redundancy protocol (VRP) interface) via a default IP address used for a DHCP server.

In embodiments, the system 200 may receive, via a public interface 204 of the routing platform 202, a KVM access request from a user 102 wishing to access and/or control a specific KVM target device 114. In response to the KVM access request, the A1 container (212, FIG. 2) may initiate a KVM session. For example, the KVM session may allow the user 102 to connect to the desired KVM target device 114 via the software routing layer 216, interacting with and/or controlling the target device via the transmission of KVM data at real-time or near real-time speed.

In embodiments, the A1 application container 212 may create for the KVM session a network address translation (NAT) routing rule 304 providing for a single IP address externally visible to the user 102, via which the user may connect to one (or more) KVM target devices 114 as described in greater detail below. For example, the NAT routing rule 304 may direct KVM data received from the user 102 to the private port 222 to which a peripheral routing device 112, and via the peripheral routing device the desired KVM target device 114, is connected.

In embodiments, the A1 application container 212 may establish, in conjunction with the NAT routing rule 304, a dedicated interface 306 via which the user 102 may provide KVM data for the initiated KVM session directly to the A2 application container 214. For example, by bypassing the A1 application container 212, the dedicated interface 306 allows the optimized A2 application container 214 to assign KVM data a maximum priority level such that KVM data is processed, and routed via the bonded interface 300 and the private VLAN 210 to the private port 222 (e.g., and thereby to the peripheral routing device 112 and KVM target device 114), without preemption by other data streams. In embodiments, when a KVM session is terminated, the A1 application container 212 may delete the associated NAT routing rule 304.

In embodiments, by incorporating a general-purpose A1 application container 212 and an optimized A2 application container 214, optimized for prioritized KVM data processing, the system 200 may process and route KVM data efficiently and securely. Further, the A2 application container 214 may maintain data security by creating and removing transport layer 3 routes within the KVM to IP environment (100, FIG. 1), providing for the routing of KVM data from a public external network interface (e.g., web-based UI 104, FIG. 1) through the internal private VLAN 210 and VRF interface 302 with direct access to individual KVM data targets (e.g., KVM target devices 114). In embodiments, when the A1 application container 212 establishes the dedicated interface 306 and NAT routing rule 304 for a particular KVM session corresponding to a request from the user 102 to access the KVM target device 114, the A2 application container 214 may create a specific transport layer 3 route providing for direct routing of KVM data from the user (and only the user 102) through the private VLAN 210 to the requested KVM target device. For example, when the KVM session is terminated by the A1 application container 212, the A1 application container 212 may delete the associated NAT routing rule 304, and the A2 application container 214 may delete the associated transport layer 3 route, to prevent intrusion from unauthorized users.

Figure 3B:
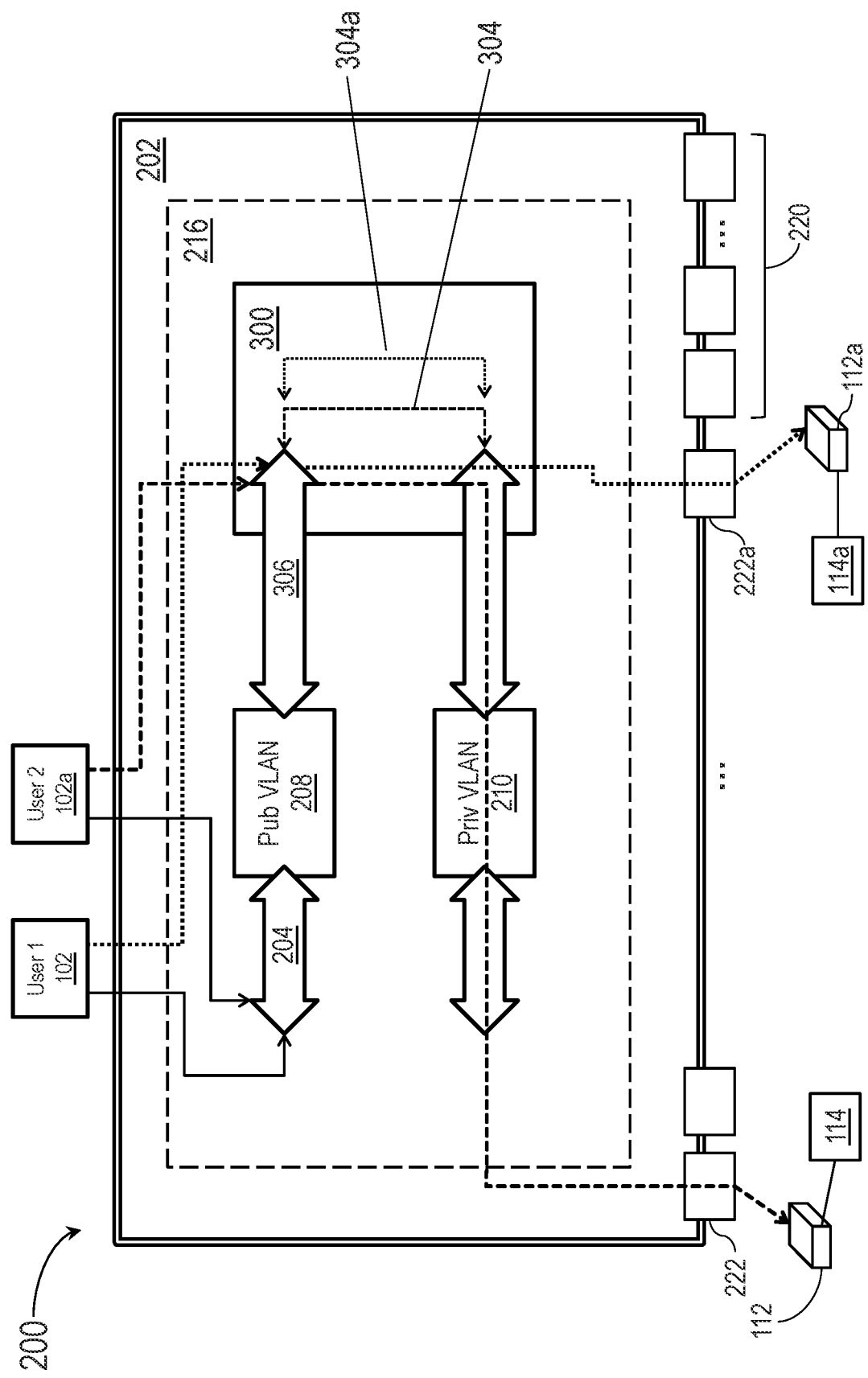

Under certain circumstances, a NAT routing rule 304 created and deleted by the A1 application container 212 may be re-used, allowing a user 102 to access multiple KVM target devices 114 via a single NAT routing rule. Referring also to FIG. 3B, in embodiments the user 102 may transmit an additional KVM access request directed to a different KVM target device 114a (e.g., associated with a different private port 222a and a different peripheral routing device 112a). For example, the A1 application container 212 may restore the NAT routing rule 304 previously created for a prior KVM session involving the same user 102 (see, e.g., FIG. 3A) and re-use the NAT routing rule 304 for any subsequent KVM sessions involving that user. In embodiments, the A2 application container 214 may create, and subsequently delete, new transport layer 3 routes for restored/re-used NAT routing rules 304 connecting the user 102 with new KVM target devices 114a.

In embodiments, the system 200 may receive a KVM access request from an additional user 102a, e.g., directed to any KVM target device 114, 114a reachable via the system (e.g., which may include the original KVM target device 114 accessed by the first user 102). For example, the A1 application container 212 may initiate a new KVM session to connect the user 102a to the desired KVM target device 114, 114a and establish a new NAT routing rule 304a associated with a new IP address externally visible to the user 102a. When the new KVM session is terminated, the new NAT routing rule 304a may similarly be deleted by the A1 application container 212 (and the transport layer 3 route deleted by the A2 application container 214), although the new NAT routing rule 304a may similarly be restored and re-used for subsequent KVM sessions involving access requests by the user 102a.

Figure 4A:
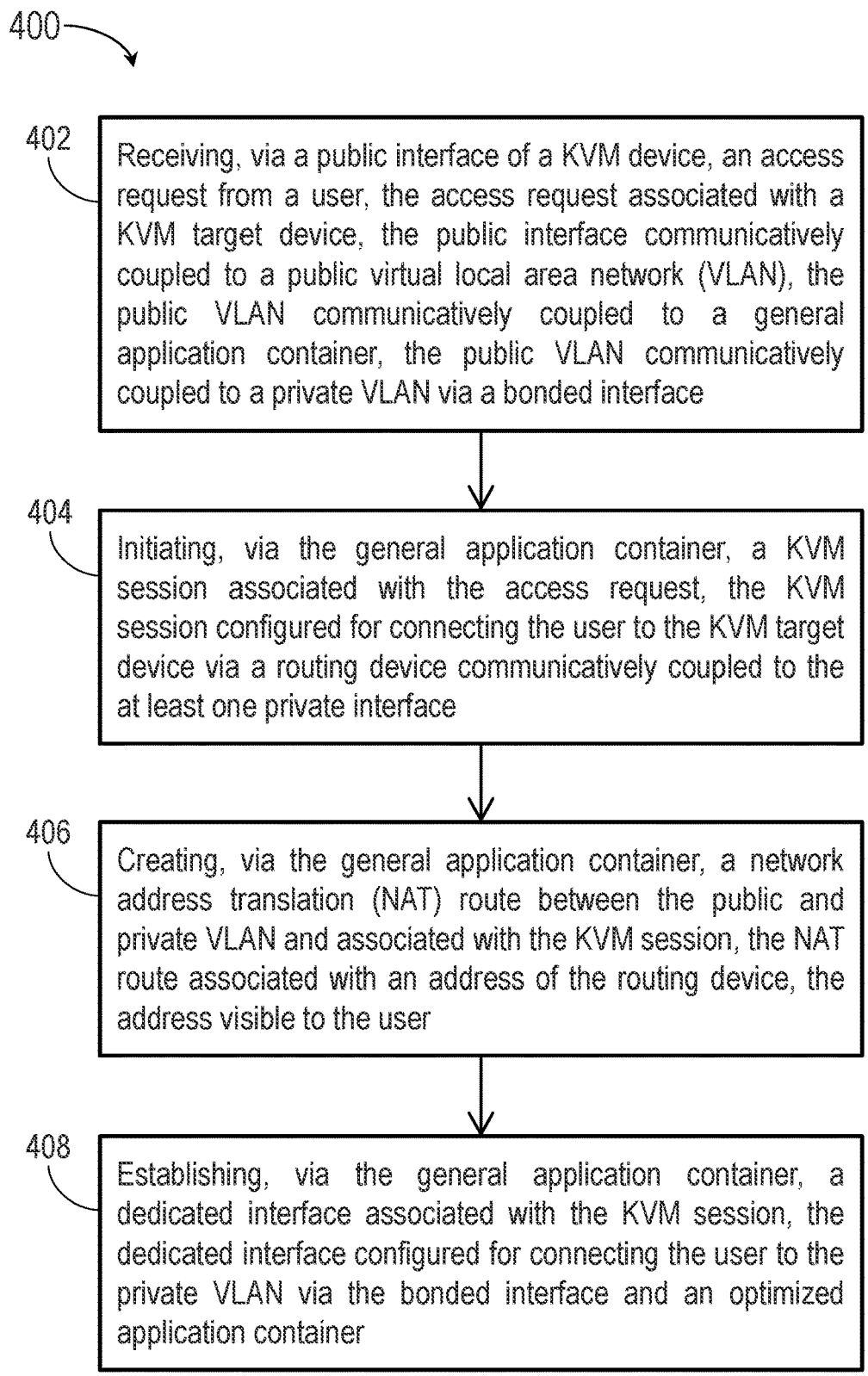

Referring now to FIG. 4A, the method 400 may be implemented by the system 200 and may include the following steps.

At a step 402, a public interface of a KVM device (or of a system distributed across two or more KVM devices) receives a KVM access request from a user (e.g., to access a particular KVM target device within a KVM over IP environment). For example, the public interface may be in communication with a public VLAN, which in turn is coupled to general purpose application containers. The public VLAN may further be in communication with a private VLAN via a bonded interface.

At a step 404, the general application container initiates a KVM session for the received access request in order to connect the user to the requested KVM target device via a peripheral routing device connecting the target device to the system via a private interface.

At a step 406, the general purpose application container creates a network address translation (NAT) route between the public and private VLAN. For example, the NAT route is associated with a network address for the peripheral routing device, limited to the requested KVM session and visible only to the requesting user.

At a step 408, the general purpose application container of the KVM device or system creates a dedicated interface via which the requesting user may directly access the private VLAN via the bonded interface and an optimized application container (e.g., optimized to prioritize KVM data so the KVM data may pass unpreempted). Further, the optimized application container may establish a transport layer 3 route for the KVM session.

Referring also to FIG. 4B, at a step 410, the optimized application container receives, via the dedicated interface, KVM data from the requested user for the current KVM session.

At a step 412, the optimized application container assigns a maximum priority to the received KVM data (e.g., to prevent preemption).

At a step 414, the optimized application container routes (without preemption) the received KVM data to the KVM target device.

Figure 4C:
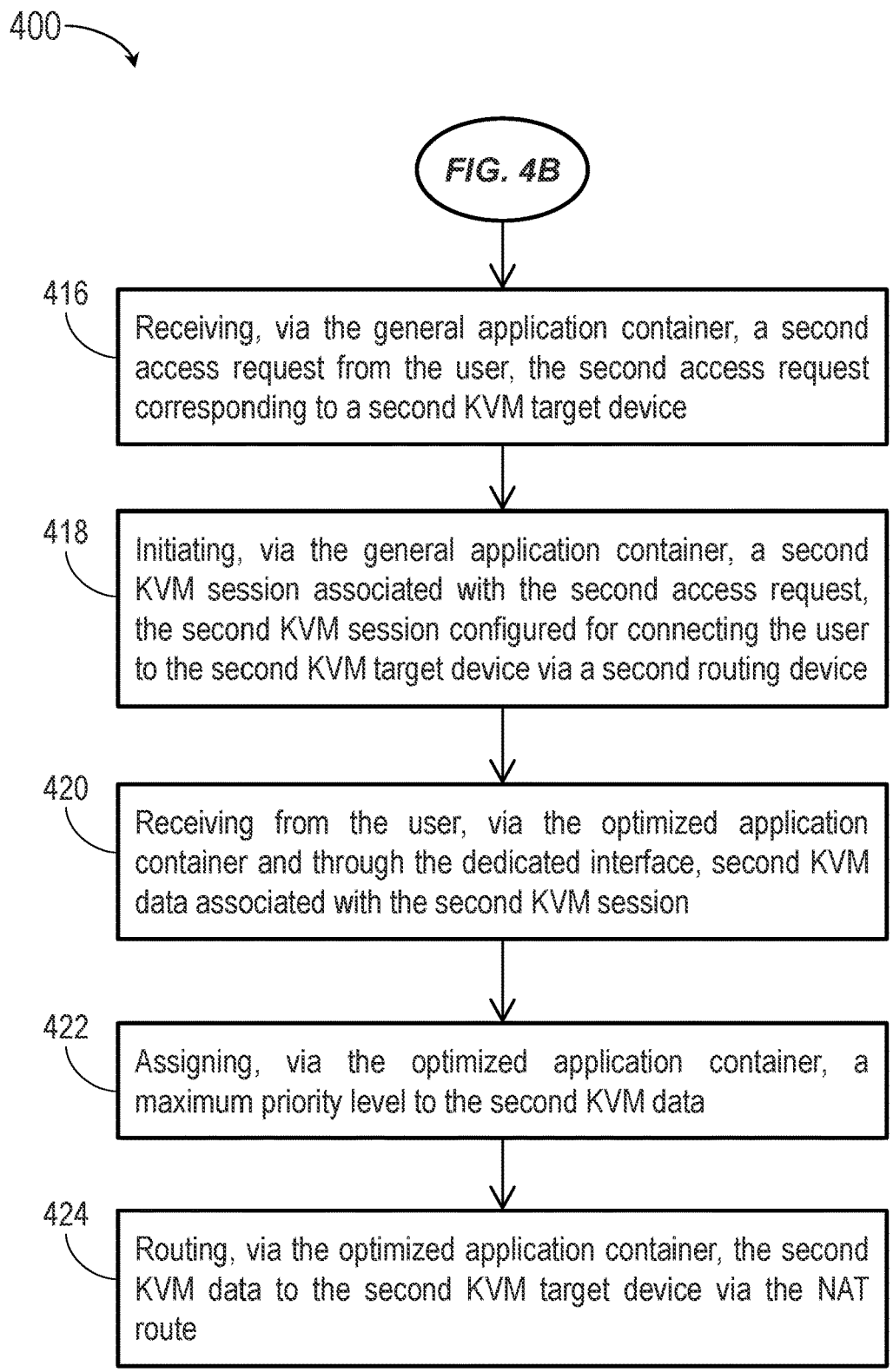

Referring also to FIG. 4C, the method 400 may include additional steps 416 through 424. At the step 416, the general application container receives an additional KVM request from the user to access a second KVM target device.

At a step 418, the general application container initiates a second KVM session for the second KVM access request. For example, the second KVM session may connect the user to the desired second KVM target device via an associated second peripheral routing device. Further, the general application container may restore the deleted NAT route originally created for the initial KVM access request from the user and deleted upon termination of the first KVM session.

At a step 420, the optimized application container receives, via the dedicated interface, KVM data for the second KVM session from the requesting user.

At a step 422, the optimized application container assigns a maximum priority to the second received KVM data.

At a step 424, the optimized application container routes (without preemption) the second KVM data to the desired second KVM target device via the restored NAT route. For example, the general application container may delete the NAT route after the first KVM session terminates, and then restore and re-use the NAT route for subsequent KVM sessions for the same requesting user.

Figure 4D:
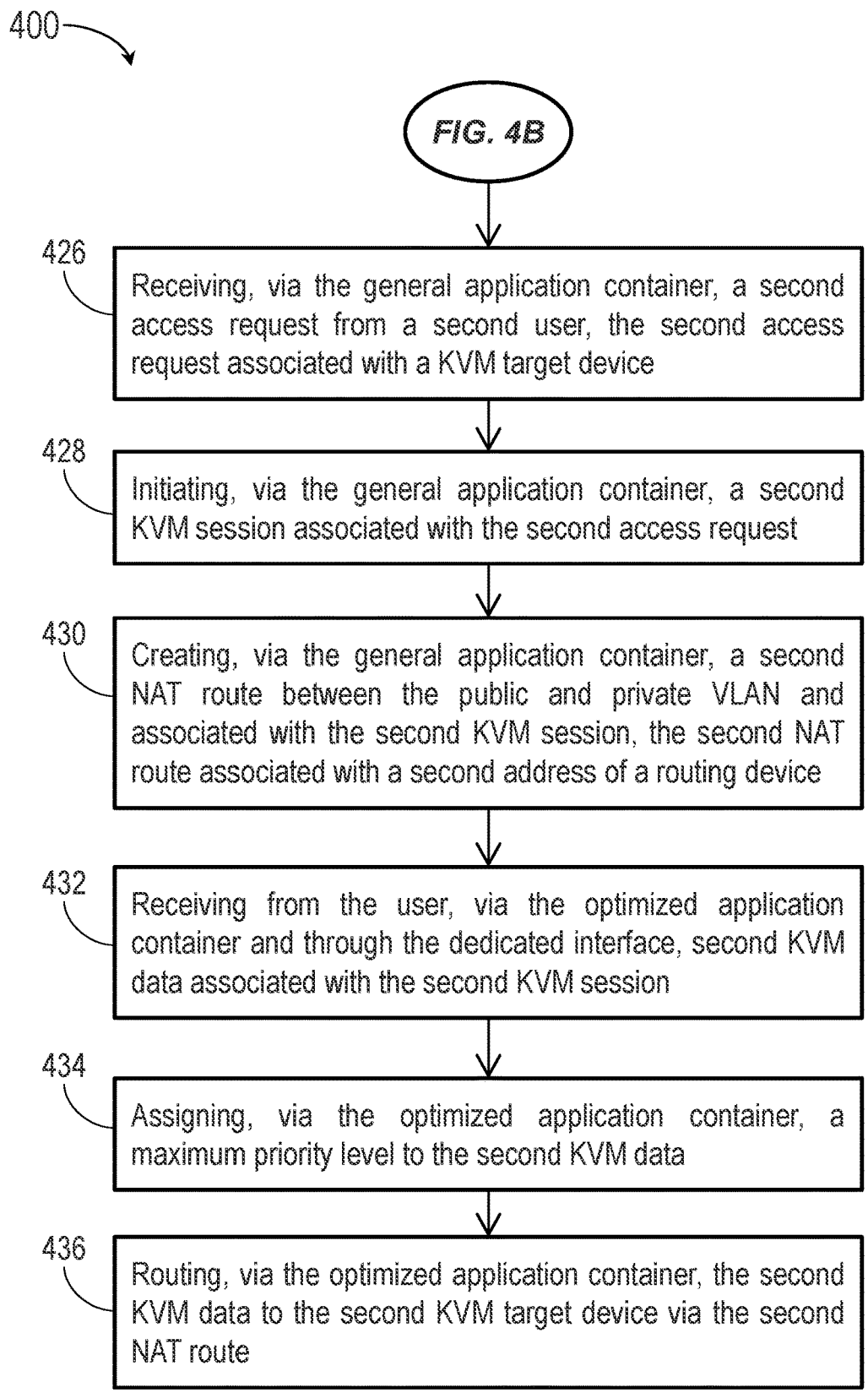

Referring also to FIG. 4D, the method 400 may include the method steps 426 through 436. At the step 426, the general application container receives a second KVM access request from a second user. For example, the second KVM access request may involve the same KVM target device as the initial KVM access request, or a new target device within the KVM over IP environment.

At a step 428, the general application container initiates a new KVM session for the new KVM access request.

At a step 430, the general application container creates a new NAT route between the public and private VLAN for the new KVM session. For example, the new NAT route includes a second address for the peripheral routing device for the requested KVM target device, the second address visible to the new requesting user. The general application container may delete the original NAT route (associated with the first KVM session requested by the first user) and create the new NAT route for a new KVM session involving a new requesting user (e.g., and any subsequent KVM access request from that user).

At a step 432, the optimized application container receives from the second user, via the dedicated interface, new KVM data for the new KVM session.

At a step 434, the optimized application container assigns maximum priority data to the received KVM data from the second requesting user.

At the step 436, the optimized application container routes (without preempting) the KVM data received from the second requesting user to the desired KVM target device via the new NAT route.

The system and method for optimizing computing resources and data flow of keyboard, video, and mouse (KVM) media in network provides a number of advantages. For example, through implementation in a multi-core processor, the system may provide for offloading non-optimized CPU intensive network processes onto optimized CPU intensive network processes via network routing rules and configuration. The multi-core processor may be an INTEL multi-core processor in which the system may operate according to a Linux operating system. It is contemplated that the system may provide near real-time optimization of switching due to the process of the present disclosure being executed solely by a separate core of the multi-core processor.

Additionally, the system 200 may allow re-use/overloading internal network routing to direct KVM media directly to privately switched devices. In such a manner, the system may provide for improved switching capability of Layer 3 protocols as described above. It is contemplated that the public network to private network communications through the software routing layer 216 (FIG. 2) may be processed in parallel, further optimizing efficiency of the system of the present disclosure. It is further contemplated that embodiments of the inventive concepts disclosed herein may be suitable for supporting enterprise applications that serve Layer 3 communications typically handled by complex routing devices which are exorbitantly expensive and provide limited flexibility.

The employment of NAT routing rules that can be reused after a route is created by the A1 general purpose application container (for processing by the A2 optimized application container) is beneficial in that it allows using a single external visible IP address and port to be re-used for connections to multiple different private KVM targets while the previously established IP connection remains intact.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

We claim:

1. A system comprising:
a plurality of keyboard, video, and mouse (KVM) targets;
a public interface communicatively coupled to a public virtual local area network (VLAN);
a private interface communicatively coupled to a private VLAN;
a bonded interface configured to communicatively couple the public VLAN and the private VLAN;
a general-purpose application container communicatively coupled to the public VLAN and the private VLAN, wherein the general-purpose application container is configured to:
process session configuration data;
and
create a network address translation (NAT) route between the public VLAN and the private VLAN;
and
a second application container communicatively coupled to the public VLAN and the private VLAN, wherein the second application container is configured to:
process KVM data;
prioritize the processing of the KVM data above all other data streams;
and
route the KVM data to each KVM target of the plurality of KVM targets via a dedicated interface corresponding to the KVM target, the dedicated interface bypassing the general-purpose application container.

2. The system of claim 1, wherein the system is embodied in two or more processors distributed among two or more communicatively coupled KVM devices within a KVM environment.

3. The system of claim 1, wherein the general-purpose application container is configured to preempt the KVM data in favor of one or more higher priority data streams.

4. A keyboard, video, and mouse (KVM) switching device, comprising:
one or more private interfaces configured for connecting the KVM switching device to one or more target devices via at least one routing device;
one or more public interfaces configured for connecting one or more users to the KVM switching device, the one or more public interfaces configured to receive from the one or more users at least one KVM access request associated with a target device;
a plurality of processing cores operatively coupled to the one or more private and public interfaces, the plurality of processing cores including at least one first processing core comprising:
a public virtual local area network (VLAN) communicatively coupled to the one or more public interfaces;
a private VLAN communicatively coupled to the one or more private interfaces;
a bonded interface communicatively coupling the public and private VLAN;
at least one general application container communicatively coupled to the public VLAN and the private VLAN;
and
at least one second application container communicatively coupled to the public VLAN and the private VLAN;
the at least one general application container configured to:
initiate a KVM session associated with the KVM access request, the KVM session configured for connecting the requesting user to the requested target device;
create a network address translation (NAT) route between the public VLAN and the private VLAN and associated with the KVM session, the NAT route associated with an address of the routing device connecting the KVM switching device to the target device;
and
establish a dedicated interface associated with the KVM session, the dedicated interface configured for 1) connecting the requesting user to the private VLAN via at least one of the second application container and the bonded interface and for 2) bypassing the at least one general application container;
and
the at least one second application container configured to:
receive from the user, via the dedicated interface, KVM data associated with the KVM session;
prioritize the processing of the received KVM data above all other data streams;
and
route the KVM data to the requested target device via the dedicated interface bypassing the general-purpose application container.

5. The KVM switching device of claim 3, wherein the access request is a first access request, the target device is a first target device, the address is a first address, and the KVM session is a first KVM session, wherein:
the at least one general application container is configured to:
receive from the requesting user a second KVM access request associated with a second target device;
and
initiate a second KVM session associated with the second access request, the second KVM session configured for connecting the requesting user to the second target device;
and
the at least one second application container is configured to:
receive from the user, via the dedicated interface, second KVM data associated with the second KVM session;
assign a maximum priority level to the received second KVM data;
and
route the second KVM data to the second KVM target device via the NAT route.

6. The KVM switching device of claim 5, wherein the at least one general application container is configured to:
delete the NAT route associated with the first KVM session;
and
re-use the NAT route for the second KVM session.

7. The KVM switching device of claim 4, wherein the user is a first user, the access request is a first access request, the NAT route associated with an address is a first NAT route associated with a first address, and the KVM session is a first KVM session, wherein:
the at least one general application container is configured to:
receive from a second user a second KVM access request corresponding to a KVM target device;

initiate a second KVM session corresponding to the second KVM access request;
and
create a second NAT route between the public VLAN and the private VLAN and corresponding to the second KVM session, the second NAT route associated with a second address;
and
the at least one second application container is configured to:
receive from the user, via the dedicated interface, second KVM data associated with the second KVM session;
assign a maximum priority level to the received second KVM data;
and
route the second KVM data to the requested KVM target device via the second NAT route.

8. The KVM switching device of claim 7, wherein the at least one general application container is configured to delete the first NAT route.

9. The KVM switching device of claim 7, wherein:
the first address is visible to the first user;
and
the second address is visible to the second user.

10. The KVM switching device of claim 4, wherein the address of the routing device is visible to the requesting user.

11. The KVM switching device of claim 4, wherein:
the at least one general application container is not configured to prioritize the KVM data by assigning the maximum priority level to the KVM data.

12. A method for processing keyboard/video/mouse (KVM) data, the method comprising:
receiving, via a public interface of a KVM device, an access request from a user, the access request associated with a KVM target device, the public interface communicatively coupled to a public virtual local area network (VLAN), the public VLAN communicatively coupled to a general application container, the public VLAN communicatively coupled to a private VLAN via a bonded interface;
initiating, via the general application container, a KVM session associated with the access request, the KVM session configured for connecting the user to the KVM target device via a routing device communicatively coupled to the private VLAN via at least one private interface;
creating, via the general application container, a network address translation (NAT) route between the public and private VLAN and associated with the KVM session, the NAT route associated with an address of the routing device, the address visible to the user;
establishing, via the general application container, a dedicated interface associated with the KVM session, the dedicated interface configured for connecting the user to the private VLAN via the bonded interface and a second application container and for bypassing the general application container;
receiving, at the second application container and via the dedicated interface, KVM data from the user, the KVM data associated with the KVM session;
assigning, via the second application container, a maximum priority level to the received KVM data;
and
routing, via the second application container, the KVM data to the KVM target device via the dedicated interface.

13. The method of claim 12, wherein the access request is a first access request, the KVM target device is a first KVM target device, the KVM session is a first KVM session, and the routing device is a first routing device, further comprising:
receiving, via the general application container, a second access request from the user, the second access request corresponding to a second KVM target device;
initiating, via the general application container, a second KVM session associated with the second access request, the second KVM session configured for connecting the user to the second KVM target device via a second routing device;
receiving from the user, via the second application container and through the dedicated interface, second KVM data associated with the second KVM session;
assigning, via the second application container, a maximum priority level to the second KVM data;
and
routing, via the second application container, the second KVM data to the second KVM target device via the NAT route.

14. The method of claim 13, wherein initiating, via the general application container, a second KVM session associated with the second access request includes:
deleting the NAT route associated with the first KVM session;
and
re-using the NAT route for the second KVM session.

15. The method of claim 12, wherein the user is a first user, the access request is a first access request, the KVM session is a first KVM session, and the NAT route associated with an address is a first NAT route associated with a first address, further comprising:
receiving, via the general application container, a second access request from a second user, the second access request associated with a KVM target device;
initiating, via the general application container, a second KVM session associated with the second access request;
creating, via the general application container, a second NAT route between the public and private VLAN and associated with the second KVM session, the second NAT route associated with a second address of a routing device;
receiving from the user, via the second application container and through the dedicated interface, second KVM data associated with the second KVM session;
assigning, via the second application container, a maximum priority level to the second KVM data;
and
routing, via the second application container, the second KVM data to the second KVM target device via the second NAT route.

16. The method of claim 15, further comprising:
deleting, via the general application container, the first NAT route.

* * * * *